United States Patent [19]

Lane et al.

[11] Patent Number: 4,655,643

[45] Date of Patent: Apr. 7, 1987

[54] ROCKBOLT AND INSTALLER WAND

[76] Inventors: William L. Lane, Box 373, Viburnum, Mo. 65566; Donald L. Lewis, 111 Birch St., Belgrade, Mo. 63622

[21] Appl. No.: 648,963

[22] Filed: Sep. 10, 1984

Related U.S. Application Data

[63] Continuation-in-part of Ser. No. 582,276, Feb. 22, 1984, and a continuation-in-part of Ser. No. 617,884, Jun. 6, 1984.

[51] Int. Cl.$^4$ .............................................. E21D 20/02
[52] U.S. Cl. .................................................... 405/260
[58] Field of Search ............... 405/259, 260, 261, 262, 405/269

[56]       References Cited
       U.S. PATENT DOCUMENTS

| | | | |
|---|---|---|---|
| 2,092,341 | 9/1937 | De Vries | 72/105 |
| 2,287,395 | 6/1942 | Reynolds | 411/23 |
| 2,849,866 | 9/1958 | Flygare et al. | 405/261 |
| 2,950,602 | 8/1960 | Lang | 411/23 |
| 3,308,505 | 3/1967 | Fischer | 52/98 |
| 3,359,742 | 12/1967 | Blatter | 405/260 |
| 3,507,121 | 4/1970 | Morfeldt | 405/260 |
| 3,613,495 | 10/1971 | Podgursky | 411/19 |
| 4,000,623 | 1/1977 | Meardi | 405/260 |
| 4,055,051 | 10/1977 | Finney | 405/261 |
| 4,098,166 | 7/1978 | Lang | 411/23 |
| 4,158,519 | 6/1979 | Gamlin | 405/260 |
| 4,224,971 | 9/1980 | Muller et al. | 411/15 |
| 4,289,427 | 9/1981 | Rolston | 405/260 |
| 4,362,440 | 12/1982 | Glaesmann | 405/269 |
| 4,386,876 | 6/1983 | Dupeuble | 405/260 |
| 4,461,600 | 7/1984 | Norkus et al. | 405/260 |
| 4,556,344 | 12/1985 | White | 405/261 |

OTHER PUBLICATIONS

Underground Excavations in Rock by F. Hoek and E. T. Brown, pp. 333–342.
Celtite Resin Injection Systems (brochure).

*Primary Examiner*—David H. Corbin
*Attorney, Agent, or Firm*—Senniger, Powers, Leavitt and Roedel

[57]  ABSTRACT

A rockbolt for installation in a bore in the roof of an underground excavation to support the roof and an installer wand for temporary insertion into the rockbolt to provider hardenable material to the rockbolt. The rockbolt comprises a sleeve, ports in the sleeve near the upper end, and means inside the sleeve for engaging the installer wand inserted into the sleeve. The installer wand comprises an elongated member for conducting hardenable binder, means for connecting the lower end of the elongated member to a source of hardenable binder material, and a head at the upper end of the elongated member to engage the engaging means in the rockbolt and conduct binder from the wand to the rockbolt.

17 Claims, 7 Drawing Figures

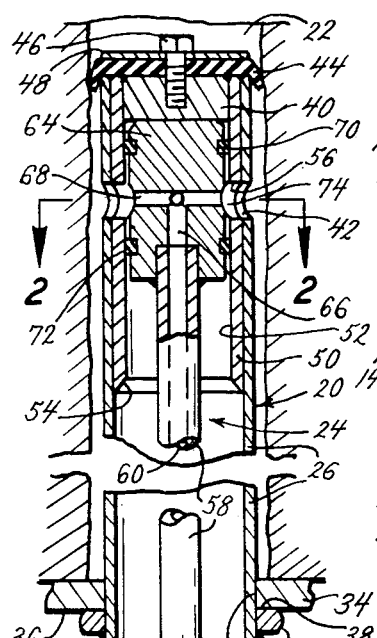

ROCKBOLT AND INSTALLER WAND

BACKGROUND AND SUMMARY OF THE INVENTION

This application is a continuation-in-part of U.S. application Ser. No. 582,276, filed Feb. 22, 1984, entitled ROCKBOLT, and of U.S. application Ser. No. 617,884, filed June 6, 1984, entitled BINDER-INJECTING ROCKBOLT. This invention relates to roof bolts or rockbolts for supporting the roofs of underground excavations, such as tunnels or mines.

Rockbolts are long bolts used in the roof of an underground excavation for support. The upper end is secured in a bore in the roof, and the lower end engages a faceplate which engages the roof. Rockbolts are not usually used alone, but rather are arranged in a grid-like network in the area to be supported, normally spaced apart in two to four root (60.96 to 121.92 cm.) intervals. Thus, in a twenty by thirty foot (6.096 by 9.144 meters) area it would not be uncommon to have sixty or more rockbolts.

There are two types of rockbolts: untensioned rockbolts which engage the bore along substantially the length of the bolt supporting the roof by engaging the overlying rock, and tensioned rockbolts which engage the rock at the upper end and at the lower end compressing the surrounding rock. In the grid-like pattern in which the bolts are used, tensioned rock bolts create ribs of compressed rock across the roof span, which actually act like beams.

Rockbolts have been used for many years, during which time many types have been developed. A good description of prior rockbolts can be found in *Underground Excavations in Rock* by E. Hoek and E. T. Brown, incorporated herein by reference. The development of rockbolts is also discussed in our prior, copending applications Ser. No. 582,276 filed Feb. 22, 1984, and Ser. No. 617,884 filed June 6, 1984, both incorporated herein by reference.

Various types of metal bolts which anchor by friction have been developed, but these bolts can be expensive to manufacture and difficult to install because the bore size was critical to proper engagement. The bolts could not be tensioned and they were subject to corrosion. A more recent version is an inflatable bolt comprising a collapsed tube inserted in the bore and inflated with high pressure fluid. However, expansion of the tube puts radial stress on the rock causing it to crack. This bolt can corrode, it is expensive, and it cannot be tensioned. The strength of the bolt is limited because its walls must be thin enough to flex.

Grout has been used to secure metal rods or wooden dowels in the bores because it provides good engagement and protects metal rods from corrosion. However, large quantities of grout are needed or larger, more expensive rods are needed. Furthermore, the bore is usually longer than the rod, and as the rod is inserted, it pushes grout up into the dead space at the top of the bore. Grout is very messy and difficult to handle. It generally must be made at the site of use and near the time of use and extra personnel and special equipment are needed to handle the grout, even so large amounts of grout are wasted. Further, the grouted rods generally are not tensioned.

One type of grouted rockbolt, often called a perfobolt, consists of two perforated half tubes filled with grout, wired together, and inserted in the bore. A rod is driven into the tube, extruding the grout through the perforations. Such a bolt was shown in Flygare et al., U.S. Pat. No. 2,849,866, incorporated herein by reference. This type of bolt was time consuming to install, and required special equipment, and could not be tensioned.

Recently, cartridges of hardenable resin and catalyst have been inserted into the bore and punctured and mixed by inserting and turning the rod. This achieves a very secure engagement, but large amounts of expensive resins are needed, especially in larger bores or where installing the rods pushes the resin into the dead space at the top of the bore. It is difficult to insert the cartridges and the rod into the bore and special equipment is often needed. It is also difficult to properly mix the resin, and bore size and rod size are critical to proper mixing. Adequate mixing also requires that the rod be rotated for an extended time, and quality can vary from bolt to bolt, ultimately depending upon the particular installer.

An example of a resined rockbolt is shown in Lang, U.S. Pat. No. 4,098,166, incorporated herein by reference. The Lang device has a specially designed rod and faceplate to facilitate the installation of the rod and the mixing of the resin.

In some rockbolts, binder is pumped in after the rods are installed through packing sealed in the mouth of the bore. Large quantities of expensive binder are needed, and air trapped in the top of the bore opposes the flow of binder and leaves air pockets which weaken the bolt. Further, the binder must be promptly used or it will set, jamming the equipment and wasting binder.

In another type of bolt, the binder is injected through a central injection tube reinforced by semi-cylindrical sections assembled about the tube as the tube is fed into the bore. The binder fills the annular space between the support sections and the bore walls and the column inside the sections. Large quantities of expensive binder are used, and the separate sections provide less structural strength than a solid member, and cannot be tensioned.

Tensioned rockbolts are generally preferred over the untensioned types and the first development in this area was a metal rod having a slotted upper end and a wedge disposed in the slot, the end was expanded and the rod tensioned. Unfortunately there was only a small contact area so the rod could slip, and bore length and diameter were critical to proper installation. Corrosion of the rod was also a problem. A mechanical anchor or expansion shell on the end of the rod replaced the wedge/slot mechanism, but these were more expensive, they still provided a relatively small contact area, and the problem of corrosion persisted. Mechanically anchored bolts were subject to loosening as the surrounding rock weakened under stress, and had to be periodically retensioned.

Some tensioned rockbolts were back-filled with grout after the rod was tensioned to achieve a more secure engagement in the bore and to reduce corrosion. The rod was installed along with tubes through which grout could be pumped. Sometimes cable was used instead of a rod. This bolt was expensive, special equipment was needed to make and handle the grout, correct installation required skilled labor, and the grout tubes were frequently broken during installation. Grout has also been used to anchor the rod end. Once the grout set, the rod could be tensioned. The problems of handling the grout, of broken grout lines, and of the need for skilled labor persisted.

Resin has also been used to anchor rockbolts. Fast setting resin cartridges are inserted in the bore, followed by slow setting resin cartridges and a rod is driven into the bore, bursting the cartridges. The faster setting resin at the top of the rod sets and anchors the rod so that it can be tensioned before the rest of the resin sets. With this system, a lot of expensive resin is required and special equipment is often needed to insert the cartridges and install the rod.

Applicants have previously developed a self-contained rockbolt comprising a sleeve with ports at its upper end and containing cartridges of a hardenable binder, such as resin or grout, and a plunger slideably disposed in the sleeve. This rockbolt is simply inserted into the bore and the plunger is operated, for example with pressurized fluid, to extrude the binder from the ports in the upper end of the sleeve. This rockbolt can be used as a tensioned or untensioned rockbolt. This rockbolt is the subject of applicants' co-pending application Ser. No. 582,276 titled ROCKBOLT filed Feb. 22, 1984.

Applicants' have previously developed a binder injecting rockbolt that utilizes bulk binder supplied to the rockbolt under pressure. The rockbolt comprises a sleeve having at least one port near its upper end, and a central member axially disposed in and extending substantially the length of, the sleeve. The central member defines an annular chamber in the sleeve, reducing the amount of binder required and acting as a structural member. At least one port is provided in the lower part of the sleeve for the introduction of binder under pressure. This rockbolt can be used as a tensioned or untensioned rockbolt. The rockbolt is inserted into a bore in the roof of an underground excavation and connected to a source of binder under pressure. This rockbolt is the subject of applicants' co-pending application Ser. No. 617,884 titled BINDER-INJECTING ROCKBOLT filed June 6, 1984.

The present invention is a rockbolt and installer wand combination. The rockbolt comprises a sleeve having an upper end and an open lower end. There is at least one port in the upper end of the sleeve. Inside the sleeve near the upper end is a means for engaging the installer wand inserted into the sleeve. This engaging means can be a stud designed to mate with a complementary orifice in the installer wand. The engaging means has at least one passage therein communicating with the port in the sleeve, allowing hardenable binder material supplied to the engaging means by the wand to pass out the port and fill the annular space between the sleeve and the bore wall. The rockbolt is installed in the bore through a face plate for engaging the roof surface.

The installer wand comprises an elongated member having at least one conduit therein for conducting hardenable binder material. The lower end of the wand is connected to a source of hardenable binder material under pressure. The upper end of the wand has a head adapted to engage the engaging means on the rockbolt, the head having at least one passage communicating with the conduit and aligned with the passage in the engaging means to pass binder from the wand to the rockbolt. The installer wand is inserted substantially into the sleeve until the head engages the engaging means. The source of binder is activated and binder is pumped up the wand, through the engaging means, out the ports and into the annular space between the rockbolt and bore wall. A seal on the rockbolt above the port prevents binder from traveling upward. Once sufficient binder has been extruded the wand is retracted.

More than one conduit can be provided in the wand so that multiple components of a hardenable binder material can be delivered to the rockbolt. In such case the head on the wand and the engaging means would be provided with a plurality of aligned passages so that the components could be delivered unmixed to the rockbolt. Baffles, mesh, or some other mixing device can be interposed between the engaging means and the ports to mix the binder. The advantage of the separate delivery of binder components to the rockbolt is that binder cannot harden in the reuseable installer wand and plug it up. By mixing the binder in the rockbolt, the difficulty and expense of dealing with binders is substantially reduced, and there is no wasted binder.

Applicants' new rockbolt can also be used as a tensioned rockbolt by providing a mechanical anchor on the top of the sleeve to engage the top of the bolt in the bore so that the bolt can be tensioned.

Applicants' new rockbolt combines the most desirable features of the prior rockbolts, providing a tensionable rockbolt engaged in the surrounding rock substantially along its length and encased in binder. Installation is extremely fast and can be accomplished by just one worker. The bolt is particularly adapted to be installed by automatic roof bolters now in use. Because of the simple structure, the rockbolt is relatively easy and very inexpensive to manufacture. The same basic structure is easly adapted to a variety of rockbolts—both tensioned and untensioned. The sleeve can be made by assembling smaller sleeve units so that a longer bolt than could normally be fit because of the small floor to roof clearance can be used. This also reduces the size of parts that must be made, stored, and shipped.

The extrusion of binder results in a tensioned or untensioned rockbolt bonded along its length in the bore. Applicants' rockbolt is securely engaged without radial stressing and cracking of the surrounding rock experienced with prior expanding rockbolts. The binder prevents corrosion of the rockbolt. The binder also prevents the tensioned rockbolts from loosening, eliminating the need for periodic retensioning. Finally, the binder provides a means for verifying the proper installation of the rockbolt, since when binder appears at the face plate it indicates that the rockbolt is completely encased in binder.

The depth of the bore is not as critical as it was to some prior grouted or resined rockbolts. The bore can be over drilled without the problem of pushing binder into the dead space above the rockbolt. Nor is the bore size or bolt size critical for proper mixing of binder components as it was for some prior rockbolts. The binder is pre-mixed or it is mixed by a separate mixing unit in the bolt so the size of the annular space between the bolt and bore is not important to proper mixing. The rockbolt consists essentially of a sleeve and thus is very inexpensive. There are no complex parts and no intricate assembly is required. The rockbolt only uses binder to fill the annulus between the bolt and bore. Thus the amount and expense of the binder is significantly reduced over prior bolt, further reducing the cost of applicants' new rockbolt. Because of the reduction of the amount of binder used, more effective binders, for example, epoxy type or polyurethane type resins, previously too costly to be used, can be used, so even better engagement between the rockbolt and bore can be achieved than with prior rockbolts. The new rockbolt is particularly adapted to be installed by an automatic roof bolter especially a two position turret roof bolter, as are presently in use. This will reduce the time and labor required to use the bolt, further reducing the cost of the bolt, as well as allow use of a less complicated and less expensive automatic roof bolter.

BRIEF DESCRIPTION OF THE DRAWINGS

FIG. 1 is a partial cross-sectional side view of a first embodiment of a rockbolt and installer wand combination incorporating the invention, with the middle portion omitted, showing the installer wand inserted into the rockbolt;

FIG. 2 is a cross-sectional view of the rockbolt and installer wand combination taken along the plane of line 2—2 in FIG. 1;

FIG. 3 is a side view of the head on the installer wand;

FIG. 4 is a partial cross-sectional side view of a second embodiment of a rockbolt and installer wand combination incorporating the invention, with the lower portion omitted, showing the installer wand inserted into the rockbolt;

FIG. 5 is a cross-sectional view of the rockbolt taken along the plane of line 5—5 in FIG. 4;

FIG. 6 is a cross-sectional view of the rockbolt and installer wand conbination taken along the plane of line 6—6 in FIG. 4;

FIG. 7 is a partial cross-sectional side view of a third embodiment of a rockbolt and installer wand combination incorporating the invention, with the middle portion omitted, showing the installer wand inserted into the rockbolt.

DETAILED DESCRIPTION OF THE PREFERRED EMBODIMENTS

A first embodiment of a rockbolt incorporating the invention, indicated generally as 20, is shown in FIG. 1 as it would be installed in a bore 22 in the roof of an underground excavation such as a tunnel or mine. An installer wand, indicated generally as 24, complementary to the first embodiment rockbolt 20, is shown inserted into rockbolt 20 in position to extrude hardenable binder material to secure rockbolt 20 in bore 22.

Rockbolt 20 comprises a generally cylindrical sleeve 26, having an upper and lower end and preferably sized to closely conform to bore 22. Sleeve 26 is preferably steel, but it could be some other suitable material. It is desirable that sleeve 26 have a roughened or dimpled exterior surface to facilitate engagement with hardenable binder material used to encase sleeve 26. It may also be desirable to make sleeve 26 from one or more sleeve members assembled together. The lower end of sleeve 26 is open. A ring 28 is located on the outside of sleeve 26 near the lower end, and it is secured to sleeve 26 as by welds 30. Rockbolt 20 is shown extending through hole 32 in a face plate 34 which engages roof face 36. Ring 28 forms a shoulder 38 by which rockbolt 20 can engage face plate 34. Alternatively, shoulder 38 could be formed by a raised annular welt in sleeve 26, by a flared or rolled end in sleeve 26, or by equivalent methods of fabrication.

The upper end of sleeve 26 is closed with end plug 40. Four ports 42 are provided in sleeve 26 near the upper end. Ports 42 could be positioned on the top of rockbolt 20, but as shown in FIG. 2, ports 42 are preferably equally spaced about the circumference of sleeve 26 for the even distribution of binder material. A seal, such as dish-like seal 44, is mounted on sleeve 26 above ports 42, as with bolt 46 and washer 48. The rim of seal 44 protrudes sufficiently to contact the walls of bore 22 when rockbolt 20 is installed therein to prevent binder material from traveling upward upon its extrusion from ports 42. Because of the dish-like shape of seal 44, upward pressure from the binder material forces the edges of seal 44 against the walls of bore 22 achieving an effective seal.

A cylindrical jacket 50 is secured in sleeve 26 near the upper end. Jacket 50 defines a region 52 of reduced internal circumference for receiving installer wand 24, as described below. The lower edge 54 of jacket 50 is beveled to provide a smooth transition between sleeve 26 and region 52 of reduced internal diameter. Four ports 56 are provided in jacket 50. As shown in FIG. 2, ports 56 are equally spaced about the circumference of jacket 50, aligned with ports 42 in sleeve 26.

Installer wand 24 comprises an elongated member 58 having an upper and a lower end and having at least one conduit 60 extending therethrough for conducting a hardenable binder material. Elongated member 58 could be flexible if desired. This would make insertion into rockbolt 20 easier for instance where the roof is low. The lower end of elongated member 58 has means such as threads 62 for connecting wand 24 to a source of hardenable binder material. Grout, or polyester, polyurethane, or epoxy resins, are all well known in the art as suitable binder materials. The upper end of elongated member 58 has an enlarged head 64. Head 64 is smaller than the internal circumference of sleeve 26 and thus head 64 freely travels inside sleeve 26. The smaller size of head 64 allows it to clear dimples and dents in sleeve 26. It also prevents wear of the head 64 or the seals described below, on head 64. Finally, if the head were not smaller than the sleeve, it would be difficult to remove the wand because the head would pull a vacuum in the top of the sleeve after the top of the sleeve is sealed in place with binder. However, head 64 closely conforms to the region 52 of reduced internal circumference formed by jacket 50, although head 64 can still slide in region 52. Vents 65 can be provided in head 64, extending from the top to the bottom, to pass air to make insertion or removal of the head easier. Vents 65 prevent a build up of pressure above the head upon insertion of the head and prevent formation of a vacuum above the head upon removal of the head. A passage 66 in head 64 communicates with conduit 60 in elongated member 58, extends axially upwardly, and then radially outwardly to the side of head 64, to oulets 68. Outlets 68 of passage 66 are located on the side of head 64 such that when head 64 is inserted as far as possible into sleeve 26 with the top of head 64 abutting the bottom of end plug 40, the outlets 68 are in general alignment with aligned ports 56 in jacket 50 and ports 42 in sleeve 26.

Seals, such as o-rings 70 and 72, can be provided on head 64 above and below outlets 68. Thus, when head 64 is inserted as far as possible into sleeve 26, an annular chamber 74 is defined between head 64, jacket 50, and o-rings 70 and 72. Chamber 74 contains and connects outlets 68 and ports 56 so that hardenable binder material provided by wand 24 can pass from head 64 through ports 56 in jacket 50 and out ports 42 in sleeve 26, to fill the annular space between sleeve 26 and bore 22.

In operation, rockbolt 20 is fit through hole 32 in face plate 34 and inserted into bore 22 in the roof of an underground excavation until shoulder 38 engages face plate 34 and face plate 34 engages roof face 36. Once rockbolt 20 is installed in bore 22, installer wand 24 is inserted substantially into sleeve 26, head 64 freely traveling up sleeve 26 and guided by beveled edge 54 into region 52 of reduced internal circumference, until the top of head 64 abuts the bottom of end plug 40. Alternatively, stops could be positioned on installer wand 24 to engage the bottom of sleeve 26 when installer wand 24 is inserted sufficiently into sleeve 26. This has the advantage of giving a visual confirmation to the installer that the wand is properly inserted. At this point, the source of hardenable binder material is activated, and binder material travels up conduit 60 in elongated member 58, through passage 66 in head 64, and out outlets 68. A mixing device such as mesh can be interposed in between head 64 and ports 56 and 42. The binder material passes through chamber 74, through ports 56 in jacket 50, and out ports 42 in sleeve 26. Seal 44 prevents upward travel of the binder, so the binder travels down in the annular space between sleeve 26 and bore 22. The appearance of binder at the mouth of bore 22 indicates that the rockbolt 20 and installer wand 24 have operated properly and that rockbolt 20 is completely encased in binder. Installer wand 24 is then removed from rockbolt 20 and can be used to install another rockbolt. As the binder hardens it secures rockbolt 20 in bore 22.

A second embodiment of a rockbolt, indicated generally as 100, is shown in FIG. 4 with its complementary installer wand, indicated generally as 102, inserted therein in position to extrude hardenable binder material to secure rockbolt 100 in a bore in the roof of an underground excavation.

Rockbolt 100 comprises a generally cylindrical sleeve 104, having an upper and lower end. Sleeve 104 is similar in size and material to sleeve 26 of rockbolt 20 described above. As described above with regard to sleeve 26 of rockbolt 20, the lower end of sleeve 104 is open, and a shoulder is located near the lower end of sleeve 104 to engage a face plate engaging the roof surface.

The upper end of sleeve 104 is closed with end plug 106. Four ports 108 are provided in sleeve 104 near the upper end. Ports 108 could be positioned on top of rockbolt 100 but, as shown in FIG. 5, ports 108 are preferably equally spaced about the circumference of sleeve 104. A seal, such as dish-like seal 110, is mounted on sleeve 104 above ports 108 as with bolt 112 and washer 114. Seal 110 is like seal 44 described above.

An engaging unit 116 is located inside sleeve 104 near the upper end. Unit 116 comprises an axial stud 118 and a radial stop 120 intermediate the ends of the stud. The top of stud 118 abuts end plug 106 and can be secured thereto as with bolt 112. The bottom of stud 118 is pointed. Stop 120 defines a chamber 122 near the top of rockbolt 100, containing ports 108. At least one passage 124 extends generally axially through stud 118. The lower end of passage 124 opens on the side of stud 118, below stop 120, at inlet passage 126. The upper end of passage 124 opens on the side of stud 118, above stop 120 in chamber 122, at outlet ports 128. Of course, engaging unit 116 can be positioned lower in the sleeve to reduce the distance wand 102 must travel in sleeve 104.

Installer wand 102 comprises an elongated member 130 having an upper and lower end and at least one conduit 131 extending therethrough for conducting a hardenable binder material. Elongated member 130 could be flexible, if desired. The lower end of elongated member 130 has means for connecting wand 102 a source of hardenable binder material, as described above for installer wand 24. Suitable binder materials were also discussed above. The upper end of elongated member 130 has an enlarged head 132. Head 132 is smaller than the internal circumference of sleeve 104 and thus head 132 freely travels inside sleeve 104.

Head 132 has a downwardly extending orifice 134 in its top for receiving the lower portion of stud 118. A passage 136 in head 132 communicates with conduit 131 in elongated member 130, extends upwardly, and opens on the interior sidewall surface of the orifice 134 at outlet 138. Outlet 138 is located such that when head 132 is inserted as far as possible into sleeve 104 with the top of head 132 abutting the bottom of stop 120, outlet 138 is in general alignment with inlet passage 126 on stud 118. Seals, such as o-rings 140 and 142 can be provided on the interior sidewall surface of orifice 134 above and below outlet 138. Thus when head 132 is inserted as far as possible into sleeve 104, an annular chamber 144 is defined between head 132, stud 118, and o-rings 140 and 142. Chamber 144 contains and connects outlet 138 and inlet passage 126 so that hardenable binder material provided by wand 102 can pass from head 132 through outlet 138 into stud 118 through inlet passage 126, without outlet 138 and inlet passage 126 being in precise alignment. The binder passes up passage 124, out outlet ports 128 into chamber 122. The binder passes from chamber 122 out ports 108. Head 132 could be provided with vents, like vents 65 in head 64 described above.

In operation, rockbolt 100 is fit through the hole in a face place and inserted into a bore in the roof of an underground excavation until the shoulder on the lower end of sleeve 104 engages the face place and the face plate engages the roof face. Once rockbolt 100 is installed in the bore, installer wand 102 is inserted substantially into sleeve 104, head 132 freely traveling up sleeve 104. The pointed end of stud 118 directs orifice 134 around stud 118 into proper alignment. When the top of head 132 abuts stop 120, the source of hardenable binder material is activated and binder material travels up conduit 131 in elongated member 130, through passage 136 in head 132, and out outlet 138. Alternatively stops could be provided on installer wand 102 to engage the bottom of sleeve 104 when properly inserted therein, as described above for installer wand 24. The binder then passes through chamber 144, into inlet passage 126 in stud 118, up passage 124, and out outlet ports 128. The binder fills chamber 122 and eventually passes out ports 108 in sleeve 104. Seal 110 prevents upward travel of binder, so the binder travels down in the annular space between sleeve 104 and the bore. The appearance of binder at the mouth of the bore indicates that the rockbolt 100 and installer wand 102 have operated properly and that rockbolt 100 is completely encased in binder. Installer wand 102 is then removed from rockbolt 100 and can be used to install another rockbolt. As the binder hardens it secures rockbolt 100 in the bore.

A third embodiment of a rockbolt, indicated generally as 200, is shown in FIG. 7 with its complementary installer wand, indicated generally as to 202, inserted therein in position to extrude hardenable binder material to secure rockbolt 200 in a bore in the roof of an underground excavation.

Rockbolt 200 comprises a generally cylindrical sleeve 204 having an upper and lower end. Sleeve 204 is similar in size and material to sleeve 26 of rockbolt 20 and sleeve 104 to rockbolt 100, both described above. The lower end of sleeve 200 is open, and it is provided with a collar 206 secured thereto as by welds 208. Collar 206 permits the lower end of sleeve 204 to be engaged by a standard driving tool and be turned so that rockbolt 200 can be placed in tension, as described below. Collar 206 forms a shoulder 210 that can engage a face plate, not shown, engaging the roof surface. A suitable face plate could be similar to face plate 34, previously described. Alternatively, if it is not desired to place rockbolt 200 in tension, the lower end of sleeve 204 could have a configuration like that described above for sleeve 26 of rockbolt 20 or sleeve 104 of rockbolt 100.

The upper end of sleeve 204 is closed with end plug 212. Four ports 214 are provided in sleeve 204 near the upper end. Ports 214 could be positioned on the top of rockbolt 200, but ports 214 are preferably equally spaced about the circumference of sleeve 204. A seal, such as a dish-like seal 216, is mounted on sleeve 204 above ports 214. Seal 216 is like seals 44 and 110 described above.

An engaging unit 218 is located in sleeve 204 near the upper end. Unit 218 comprises an axial stud 220 and a radial stop 222 intermediate the ends of stud 220. The top of stud 220 abuts end plug 212 and can be secured thereto. The bottom of stud 220 is pointed. Stop 222 defines a chamber 224 near the top of the rockbolt. Chamber 224 contains ports 214. A passage 226 extends generally axially through stud 220. The lower portion of passage 226 opens on one side of stud 220, below stop 222, at inlet passage 228, and on the other side of stud 220, below stop 222, at inlet passage 230. Inlet passages 228 and 230 are axially staggered on stud 220, with inlet passage 230 positioned below inlet passage 228. The upper portion of passage 226 opens on the side of stud 220 at one or more outlet ports 231 in chamber 224. Of course, engaging unit 218 can be positioned lower in sleeve 204 to reduce the distance wand 202 must travel in sleeve 204.

It may be desirable to put rockbolt 200 in tension so that it compresses the rock between its ends. To tension rockbolt 200, the ends must be engaged to the rock. The lower end of rockbolt 200 engages the roof surface via a face plate which rockbolt 200 engages with shoulder 210. The upper end of rockbolt 200 can be engaged to the rock with any of the mechanical anchors well known in the art. One such anchor 232 is shown in FIG. 7, where a threaded stud 234 is shown extending from the top of end plug 212. An expansion shell 236 is mounted over stud 234 and has four vertical fingers 238 which have a plurality of inclined teeth 240 on their exteriors. An expander member 242 is threaded onto stud 234, and has four downwardly tapering ramp surfaces 246 each engaged by the back of one of the fingers 238. Teeth 240 on fingers 238 engage the walls of the bore and prevent turning of expansion shell 236 or expander member 242. Rotation of stud 234 by turning sleeve 204 draws expander member 242 downward, opening expansion shell 236. Collar 206 on sleeve 204 facilitates turning of sleeve 204. Once expansion shell 236 is as fully expanded as the bore will allow, expander member 242 can no longer move downward. Further rotation of sleeve 204 causes stud 234 to thread upwardly, tensioning rockbolt 200, whose lower end is engaged to the roof face via the face plate. The tensioning of rockbolt 200 compresses the rock between its ends. Of course, the anchor on rockbolt 200 is optional, and could be omitted if it is not desired to place rockbolt 200 in tension. Furthermore, an anchor as just described could be provided on rockbolt 20 or rockbolt 100 if it were desired to tension these rockbolts. In such case, a collar like collar 206 on sleeve 204 should be provided on the rockbolt to operate the anchor. There are also other anchors well known in the art that could be used in place of the anchor just described.

An alternate method of tensioning rockbolt 200 or rockbolts 20 or 100 would be to only extrude, as described below, a small amount of hardenable binder, sufficient to securely engage the top of the rockbolt in the bore. Once the binder sets and anchors the top of the rockbolt, the rockbolt can be tensioned to compress the rock between its ends. The rockbolt can be tensioned by providing a threaded collar on the lower end of the rockbolt and threading a threaded ring on nut onto the collar. The nut forms a shoulder for engaging the face plate engaging the roof surface. Tightening the nut tensions the rock bolt.

Installer wand 202 comprises an elongated member 250 having an upper and lower end and at least two conduits 252 and 254 extending therethrough to separately conduct the components of a hardenable binder material. Elongated member 250 could be flexible, if desired. The lower end of elongated member 250 has means for connecting wand 202 to a source of components of hardenable binder material. Suitable binder materials include polyester and epoxy resins having at least two separable components which when mixed form a hardenable binder material, specific binder materials are well known in the art. The upper end of the elongated member 250 has an enlarged head 256. Head 256 is smaller than the internal circumference of sleeve 204 and thus head 256 freely travels inside sleeve 204.

Head 256 has a downwardly extending orifice 258 in its top for receiving the lower portion of stud 220. A passage 260 in head 256 communicates with conduit 252 in elongated member 250 and extends upwardly and opens on the interior sidewall surface of orifice surface 258, at outlet 262. Similarly, a passage 264 in head 256 communicates with conduit 254 in elongated member 250 and extends upwardly and opens on the interior sidewall surface of orifice 258, at outlet 266. Outlets 262 and 266 are located such that when head 256 is inserted as far as possible into sleeve 204, with the top of head 256 abutting the bottom of stop 222, outlet 262 is in general alignment with inlet passage 230 on stud 220 and outlet 266 is in general alignment with inlet passage 228 on stud 220. Seals, such as o-rings 267 and 268, can be provided on the interior side wall surface of orifice 258 above and below outlet 262 respectively. Similarly, seals, such as o-rings 270 and 272, can be provided on the interior side wall surface of orifice 258 above and below outlet 266, respectively. Thus, when head 256 is inserted as far as possible into sleeve 204, an annular chamber 274 is defined between head 256, stud 220, and o-rings 267 and 268, and an annular chamber 276 is defined between head 256, stud 220, o-rings 270 and 272. Chamber 274 contains and connects outlet 262 and inlet passage 230 so that a component of a hardenable binder material provided by wand 202 can pass through head 256 through outlet 262 into stud 220 through inlet passage 230, without outlet 262 and inlet passage 230 being in precise alignment. Similarly, chamber 276 contains and connects outlet 266 and inlet passage 228 so that a second component of the hardenable binder material provided by wand 202 can pass from head 256 through outlet 266 into stud 220 through inlet passage 228, without outlet 266 and inlet passage 228 being in precise alignment. It is preferable that stud 220 and orifice 258 have a tapering, stepped configuration as illustrated, with paired inlet passages and outlet ports 230 and 262, and 228 and 260, on different steps. Head 256 could be provided with vents, like vents 65 in head 64 described above.

The separate binder components provided from head 256 pass into passage 226 in stud 220 where they are preliminarily mixed. The components are pushed into chamber 224 in the upper portion of rockbolt 200 where metal or plastic mesh 278 facilitates mixing. Of course, some other mixing device can be provided in chamber 224 to facilitate mixing. The mixed binder then passes out ports 214, filling the annular space between sleeve 204 and the bore.

In operation, rockbolt 200 is fit through the hole in a face plate and is inserted into a bore in the roof of an underground excavation until the shoulder 210 on the lower end of sleeve 204 engages the face plate and the face plate engages the roof face. Sleeve 204 is turned via collar 206 to operate anchor 232 to anchor the upper end of sleeve 204 and tension rockbolt 200. Once rockbolt 200 is installed in the bore, installer wand 202 is inserted substantially into sleeve 204, head 256 freely traveling up sleeve 204. The pointed end of stud 220 directs orifice 258 around stud 220 into proper alignment. When the top of head 256 abuts stop 222, the source of hardenable binder material is activated and the components of a hardenable binder material travel separately up conduits 252 and 254 in elongated member 250, through passages 260 and 264 in head 256 and out outlets 262 and 266. Alternatively, stops could be provided on installer wand 202 to engage the bottom of sleeve 204 when properly inserted therein, as described above for installer wands 24 and 102. The still separate components separately pass through chambers 274 and 276 and into inlet passages 230 and 228 in stud 220. The binder components travel together up passage 226 in stud 220 and out outlet ports 231 into chamber 224 on top of rockbolt 200. The binder fills chamber 224 where the components are further mixed by mesh 278. The mixed binder eventually passes out ports 214 in sleeve 204. Seal 216 prevents upward travel of binder, so the binder travels downward in the annular space between sleeve 204 and the bore. The appearance of binder at the mouth of the bore indicates that rockbolt 200 and installer wand 202 have operated properly and that rockbolt 200 is completely encased in binder. Installer wand 202 is then removed from rockbolt 200 and can be used to install another rockbolt. As the binder hardens it secures rockbolt 200 in the bore.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

We claim:

1. A rockbolt for installation in a bore in the roof of an underground excavation to support the roof, the rockbolt comprising:
    a sleeve insertable into the bore and having an upper and a lower end;
    at least one port in the sleeve near the upper end;
    means inside the sleeve near the upper end for engaging a device for supplying hardenable binder material inserted into the sleeve, said engaging means having at least one passage therein communicating with the port to allow binder material to pass from the device through the engaging means and out the port, to encase the sleeve in binder material;
    means for engaging the sleeve, near the lower end, to the roof face;
    means for engaging the sleeve near the upper end to the rock surrounding the bore and means for tensioning the rockbolt to compress the rock between the upper and lower ends.

2. The rockbolt of claim 1 wherein the means for engaging the sleeve near the upper end to the surrounding rock comprises an expandable anchor on the top of the sleeve.

3. A rockbolt and installer wand combination, the rockbolt being for installation in a bore in the roof of an underground excavation to support the roof, the rockbolt comprising;
    a sleeve insertable into the bore and having an upper and a lower end;
    at least one port in the sleeve near the upper end;
    means inside the sleeve near the upper end for engaging the installer wand for supplying hardenable binder material inserted into the sleeve, said engaging means having at least one passage therethrough communicating with the port to allow hardenable binder material to pass from the wand, through the engaging means, and out the port;
    the installer wand being adapted for temporary insertion into the sleeve to provide hardenable binder material to the rockbolt near the upper end, the wand comprising:
    an elongated member having at least one conduit therein for conducting hardenable binder material;
    means for connecting the lower end of the elongated member to a source of hardenable material;
    a head at the upper end of the elongated member, the head adapted to engage the engaging means in the rockbolt and having at least one passage therein communicating with the conduit and alignable with the passage in the engaging means to conduct binder from the wand to the rockbolt.

4. The rockbolt and installer combination of claim 3 wherein:
    there are a plurality of conduits in the elongated member to separately conduct the components of a hardenable binder material;
    there are a plurality of passages in the engaging means in the rockbolt; and
    there are a plurality of passages in the head, each passage communicating with a conduit and alignable with one of the passages in the engaging means to conduct hardenable binder material as separate components from the wand to the rockbolt.

5. The rockbolt and installer wand combination of claim 4 further comprising means for mixing the separate binder components in the rockbolt between the engaging means the port.

6. The rockbolt and installer wand combination of claim 3 wherein one of either the engaging means on the rockbolt or the head adapted to engage the engaging means has a generally cylindrical vertical stud having at least one passage extending generally axially therethrough but opening on the side of the stud and wherein the other has a generally cylindrical orifice for receiving the stud, the orifice having a passage in the side wall alignable with the passage in the stud.

7. The rockbolt and installer wand combination of claim 6 wherein either the stud or the orifice has sealing means above and below the passage in that member so that when the stud is inserted into the orifice an annular chamber is defined between the seals and the stud and orifice, the chamber containing and connecting the corresponding paired passages in the stud and orifice.

8. The rockbolt and installer wand combination of claim 4 wherein one of either the engaging means on the rockbolt or the head adapted to engage the engaging means has a generally cylindrical vertical stud having more than one passage extending generally axially therethrough but opening on the side of the stud, each passage opening being axially spaced apart from the other openings, and the other having a generally cylindrical orifice for receiving the stud, the orifice having in its side passages corresponding to the passages in the stud and axially spaced apart to be alignable with the passages in the stud.

9. The rockbolt and installer wand combination of claim 8 wherein either the stud or the orifice has sealing means above and below each passage so that when the stud is inserted into the orifice, annular chambers are created between the seals and the stud and orifice, each of the chambers containing and connecting a corresponding pair of passages in the stud and orifice.

10. The rockbolt and installer wand combination of claim 3 wherein the engaging means is in an area of reduced internal diameter inside the rockbolt near the upper end and the head on the installer wand is a generally cylindrical portion freely moveable inside the rockbolt but closely conforming to the engaging means.

11. The rockbolt and installer wand combination of claim 3 wherein the head of the installer wand is provided with at least one vent extending therethrough to prevent the build up of pressure above the head as the wand is inserted into the sleeve and to prevent the formation of a vacuum above the head as the wand is removed from the sleeve.

12. A method for supporting the roof for an underground excavation, comprising:
 making a bore in the roof of the excavation;
 inserting into the bore a sleeve having an upper and a lower end, at least one port in the sleeve in the upper end, and means inside the sleeve near the upper end for engaging a device for supplying hardenable binder material inserted into the sleeve, said engaging means having at least one passage therein and communicating with the port to allow binder material to pass from the device through the engaging means and out the port;
 temporarily inserting an installer wand into the sleeve to engage the engaging means, the installer wand comprising an elongated member having at least one conduit therein for conducting hardenable binder material, the lower end of the elongated member being connected to a source of hardenable binder material, and a head at the upper end of elongated member, the head adapted to engage the engaging means of the rockbolt and having at least one passage therein communication with the conduit and alignable with the passage in the engaging means to conduct binder from the wand to the rockbolt;
 activating the source of hardenable binder material to provide binder material from the installer wand to the rockbolt.

13. The method of claim 12 further including the step of tensioning the sleeve to compress the rock between the upper and lower ends before extruding the binder material.

14. The method of claim 12 including:
 providing a plurality of conduits in the elongated member of the installer wand and separately conducting components of the hardenable binder material;
 providing a plurality of passages in the engaging means in the rockbolt;
 providing a plurality of passages in the head, each passage communicating with a conduit, aligning the passages in the engaging means, and the head, and conducting hardenable binder material as separate components from the wand to the rockbolt.

15. The method of claim 12 wherein the sleeve has an annular raised shoulder near its lower end, the method further comprising the step of inserting the sleeve through a face plate before inserting the sleeve into the bore.

16. The method of claim 12 wherein binder is extruded from the rockbolt to anchor the upper end of the rockbolt in the bore and further comprising the step of tensioning the rockbolt to compress the rock between its ends.

17. The method of claim 12 wherein the steps are performed with an automatic roof bolting machine.

* * * * *